UNITED STATES PATENT OFFICE.

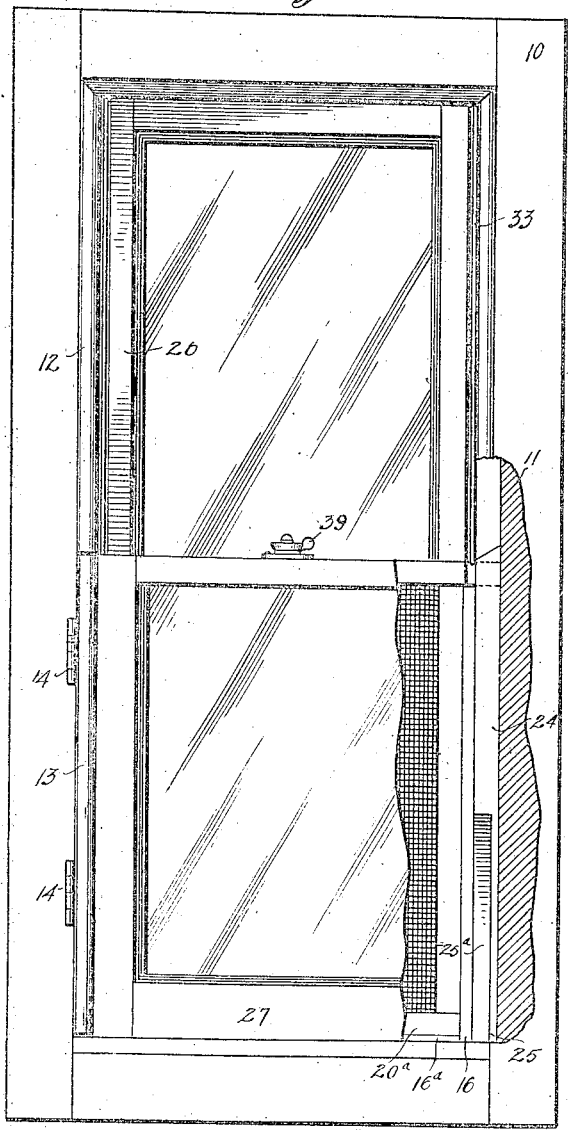

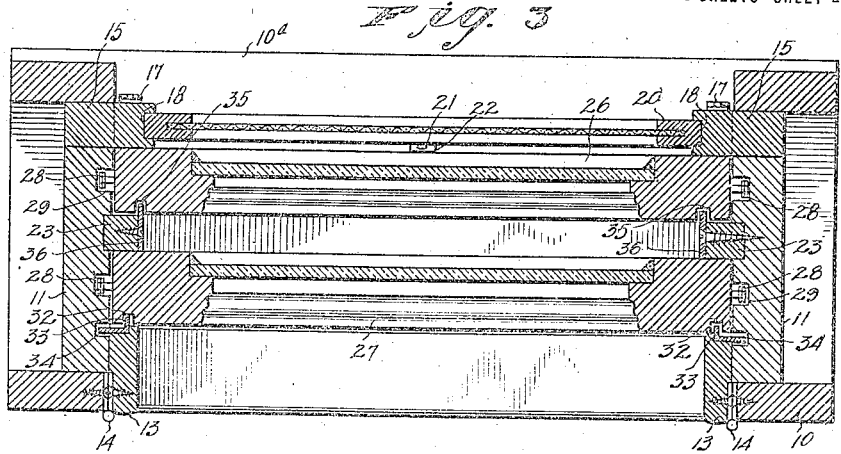
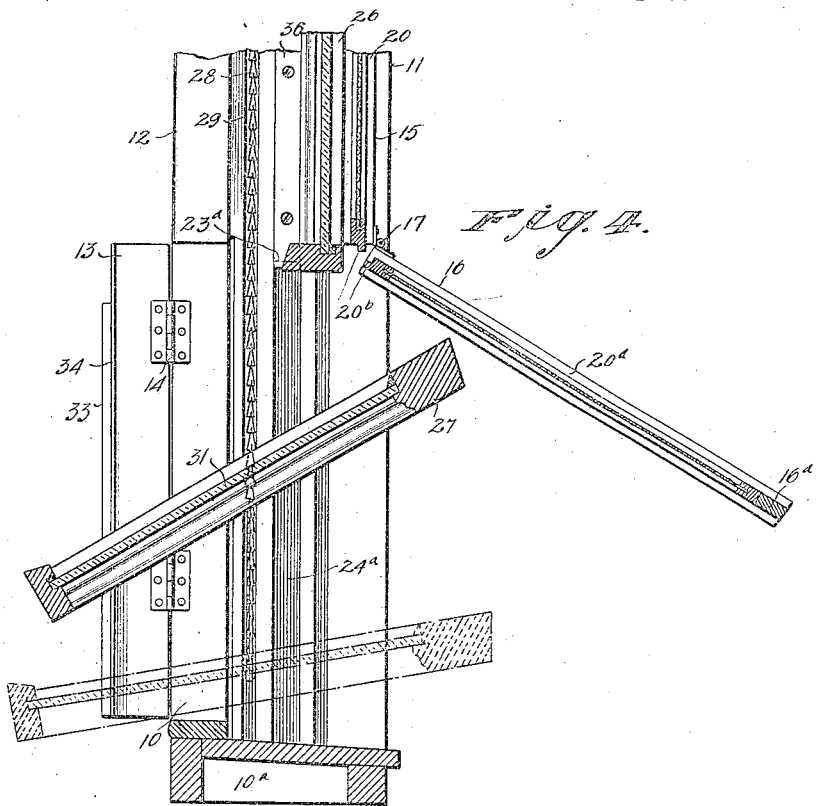

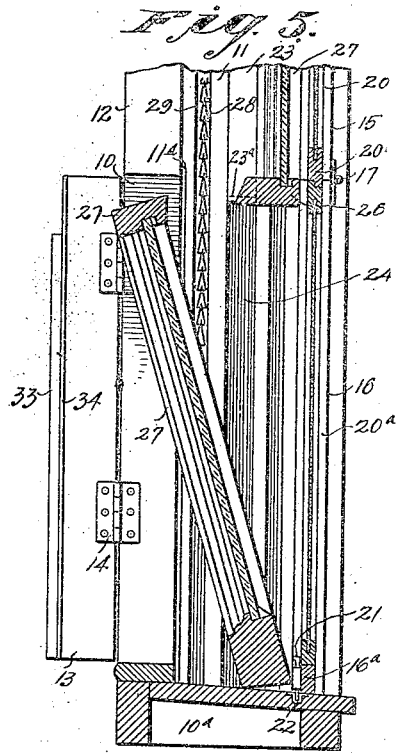
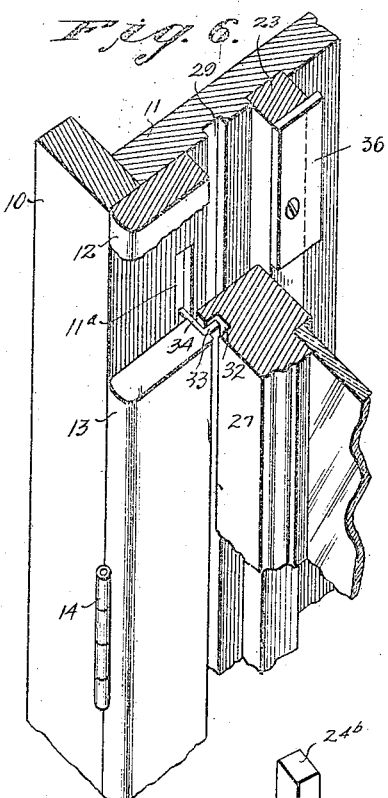
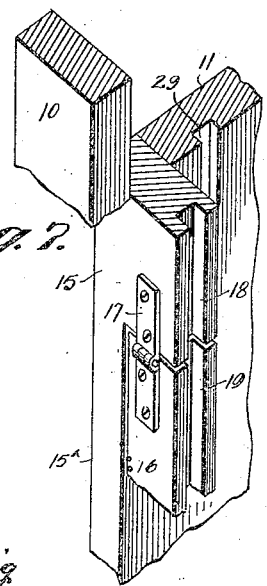
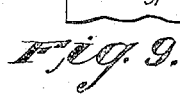
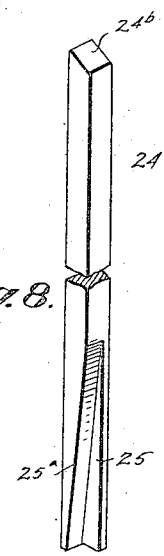

ARCHIBALD MacKINNON, OF TUCKAHOE, NEW YORK.

WINDOW.

1,379,460.  Specification of Letters Patent.  Patented May 24, 1921.

Application filed June 3, 1920. Serial No. 386,213.

*To all whom it may concern:*

Be it known that I, ARCHIBALD MACKINNON, a subject of the King of Great Britain, and a resident of Tuckahoe, in the county of Westchester and State of New York, have invented a new and Improved Window, of which the following is a description.

My invention relates more particularly to a window having sliding sashes pivotally connected with suspending chains or cords to permit of the window being turned about the pivots as an axis for the convenient cleaning of the windows.

The general object of my invention is to provide a window of the indicated type improved in various particulars, whereby to embody certain distinctive features and to obtain new results, among which are that a window sash may be turned on its pivots to a greater or less extent to provide ventilation to a greater or less degree, or may be turned to a greater extent for positioning the sash for convenient and effective cleaning, as well as a novel form and arrangement of stop beads and parting strips factoring in the provision for the turning of the sash as referred to.

A distinctive feature also resides in the utilization of the outer stops for receiving screen sashes or storm sashes in a manner to be coördinated with the turnable sashes.

Further characteristic features of my improved window reside in the novel form of the pulleys as employed whereby when the chains or cords are detached from the sashes they will automatically engage the pulley frames or plates and will thus be prevented from running completely into the sash weight pockets. Also, my improved window is characterized by novel weather strip elements associated with the sashes and parting strips all as will clearly appear as the description proceeds.

Reference is to be had to the accompanying drawings forming a part of this specification, it being understood that the drawings are merely illustrative of one example of the invention.

Figure 1 is an elevation of the window at the inner side, parts being broken away and in section;

Fig. 2 is a transverse vertical section with the lower sash in one of its ventilating positions;

Fig. 3 is a sectional plan view on the irregular line 3—3 of Fig. 2;

Fig. 4 is a fragmentary vertical section indicating the positions of the parts for the turning of a window sash for cleaning;

Fig. 5 is a fragmentary vertical sectional view showing the lower sash in position to permit a greater ventilation than the position of Fig. 2;

Fig. 6 is a fragmentary sectional perspective view, showing a portion of one jamb and the adjacent portions of the lower sash and the lower portion of the inner stop bead with the weather strip associated therewith;

Fig. 7 is a fragmentary sectional perspective view given to show the manner in which a portion of the outer stop bead is hingedly secured to swing outwardly in the turning of a sash;

Fig. 8 is a perspective view of one of the parting strips;

Fig. 9 is a fragmentary edge view of a sash frame with a device for pivotally securing it to the chain or cord.

In carrying out my invention in accordance with the illustrated example, a window frame designated generally by the numeral 10 is provided, the numeral 11 indicating the jambs.

Each inner stop bead on the window includes a fixed upper section 12 and a lower section 13 secured by suitable hinges 14 to permit it to swing outwardly from its normal position. Each of the outer stop beads 15 at the lower portion thereof is of reduced width as best seen at 15$^a$, Fig. 7, a portion of the outer stop bead being composed of a hinged section 16 adjacent to the lower sash and hinged at its upper end as at 17 to the fixed part 15, whereby said hinged lower portion may swing outwardly from the general vertical plane of the bead. In the outer edge of each outer fixed stop bead section 15, is a vertical groove 18, there being a corresponding groove 19 in the hinged stop sections 16, (see Fig. 9) adapted to aline with the groove 18 when the hinged section is in the plane of the stop. A bottom rail 16$^a$ joins the respective hinged stop sections 16 and provision may be made, if desired, for locking the same in position for holding the stop sections in alinement, there being indicated for the purpose, a vertical bolt 21 on the bottom rail 16$^a$ adapted to engage in a socket 22 in the sill structure 10$^a$ of the frame 10. The grooves 18, 19 accommodate upper and lower frames 20, 20$^a$ adapted to vertically aline with each other when the stop sections 16 are in their normal positions. Said frames in practice are either screen frames or storm sashes. The upper frame 20 is placed in the registering grooves 18 in the respective outer stops 15 and the lower frame 20ª is entered in or removed from the stop sections 16 at the upper ends of the grooves 19 when said stop sections are swung outwardly to a sufficient extent for the purpose. The adjacent ends of the frames 20 and 20ª are reversely rabbeted as at 20ᵇ to make a weather-tight joint.

The parting strips are each composed of an upper fixed section 23 and a removable lower section 24. The lower section is recessed vertically as at 25 in the face thereof extending from the lower end and presents at the bottom of said recess on the face of the strip a beveled wall 25ª. The removable strip section 24 may be fastened by any suitable means but in the preferred form, it is simply inserted partly in the vertical groove 24ª provided therefor in each jamb 11. The upper end of the removable stop section is preferably beveled as at 24ᵇ to enter an undercut recess 23ª in the lower end of the upper strip section 23.

The numeral 26 indicates the upper sash and 27 the lower sash suspended by chains 28 or their equivalent which are accommodated in vertical grooves 29 in the jambs and run over pulleys 30 to be hereinafter referred to. A pivotal connection is effected by any suitable means between the chains and the sashes, the preferred means consisting of an S-hook 28ª on each chain at the lower end thereof and presenting an eye 28ᵇ which receives a fixed pivot 31 projecting from each side edge of the sash.

With the described construction the lower sash may as indicated in Fig. 2 be turned on its pivot 31 to provide a ventilating space between the meeting rails 26ª, 27ª of the sashes, the recessed and beveled lower portions of the removable parting strip sections 24 permitting the swinging of the lower sash at an angle to the upper sash for the stated ventilation. A turning of the lower sash to a greater extent to give an increased ventilation is provided for by the removability of the strip sections 24 as indicated in Fig. 5 where the lower sash is seen to be turned to a sufficient extent to engage the bottom rail 16ª of swinging stop sections 16, said swinging stop section when locked by its bolt 21 limiting the turning movement of the sash. With the bolt 21 released the swinging stop sections 16 are free to respond to a further turning movement of the lower sash (see Fig. 4) and said stop sections may be swung upwardly to a sufficient extent to permit the turning over of the lower sash as in full lines in Fig. 4 for the convenient cleaning of the outer surface of the glass.

The sash, for cleaning, is preferably lowered to the dotted line position, Fig. 4, to be seated on the sill structure 10ª of the window frame. For the turning of the lower sash to either of the ventilating positions referred to or to the cleaning position, the hinged inner stop section 13 is swung outwardly to the position shown in Figs. 2, 4 and 5. Also, with the hinged stop section swung outwardly and the removable parting strip section out, a sash may, by first tilting it laterally, be pulled clear of the frame for the convenient attachment of the S-hooks 28ª or for affording access too the parts of the frame pertaining to the jambs.

I provide a weather strip 34 on the inner edge of each hinged stop section 13 of a form not only to effectively prevent wind or rain entering between the stop bead and the lower sash but to provide such an interlocking engagement between said stop section 13 and the sash 27 so that the said stop section cannot be swung outwardly until the lower sash is raised completely above its normal position. Each weather strip 34 is L-shaped to present at an edge thereof a flange 33 directed laterally inward at right angles or substantially so and accommodated in a vertical groove 32 in the face of a side rail of the lower sash 27. Said weather strip 34 projects beyond the inner side of the hinged stop section 13 and into a vertical groove 11ª formed in each jamb 11 so that the weather strip makes for a weather-tight construction as between the hinged stop section 13 and the jamb as well as between the edge of the said hinged section and the lower sash.

A weather strip 36 is applied to the face of each fixed parting strip section 23 and projects at its outer edge beyond the outer side of said parting strip, the projecting edges of the respective strips being accommodated in vertical grooves 35 formed in the inner faces of the side rails of the upper sash 26.

The pulley 30, see Fig. 2, is mounted in a frame presenting a front plate 37 in the lower edge of which is a V-shaped notch 38, whereby when a chain 28 is detached from the sash and permitted to run upwardly over the pulley 30, it may be swung into notch 38, and be thus prevented from running completely into the sash weight pocket. If by accident the chain is entirely released and permitted to run freely, the swinging of the chain as it approaches the notch 38 will automatically cause the chain to swing into the notch and be engaged and prevented from running into the sash.

In order that the lower sash 27 may be raised above the hinged stop section 13, I provide a pocket 40ª in the under side of the head 10ᵇ of the window frame to accommodate the sash lock member 39 of said lower sash, said pocket opening into a recess 40 formed in the under side of said head 10ᵇ.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:—

1. A window including a frame, sliding sashes therein, and suspension means pivotally connected with the sashes to permit the latter to turn about horizontal axes, said frame having parting strips formed with recesses at the sides toward the lower sash to permit the latter to be turned at an angle to its normal plane of movement to provide thereby a ventilating opening between the meeting rails of said sashes.

2. A window including a frame, sliding sashes therein, and suspension means pivotally connected with the sashes to permit the latter to turn about horizontal axes, said frame having parting strips formed with recesses, said recesses presenting beveled surfaces toward the lower sash against which the latter may be turned to provide a ventilating opening between the meeting rails of the sashes.

3. A window including a frame, sliding sashes therein, and suspension means pivotally connected with the sashes to permit turning of the latter, said frame having means to provide for different degrees of ventilation between the meeting rails of the sashes, said means consisting of parting strips, the lower sections whereof adjacent to the lower sashes are removable, said removable sections being formed with recesses at the sides toward the lower sash permitting a turning movement of the latter to position it at an angle to the plane of the upper sash to thereby provide a limited ventilating opening between the meeting rails of the sashes, the sashes when said strip sections are removed being turnable on their pivots at such an angle as to engage and be arrested by the outer stop beads of the window frame to provide an increased ventilating opening.

4. A window including a frame, slidable sashes therein, suspension means pivotally secured to said sashes to permit the latter to turn on horizontal axes, said frame having outer stops, the lower portions of said stops being swingably mounted, inner stops on the frame, the lower portions of which inner stops are mounted to be movable away from the plane of the lower sash to permit the latter to turn on its horizontal axis to a position to engage the swingably mounted members of the outer stops, and parting strips having those portions thereof adjacent to the lower sash formed with recesses presenting oblique walls permitting a limited turning movement of the lower sash, said lower portions of the parting strips being removable to permit swinging movement of the lower sash to a further extent.

5. A window including a window frame, slidable sashes therein, suspension means to which the sashes are pivotally secured, outer stops on said frame, the portions of which stops at the upper sashes have vertical grooves in the oppositely disposed faces thereof, those portions of said stops at the lower sashes consisting of members hinged at their upper ends to swing outwardly and said members presenting vertical grooves normally alining with the first-mentioned grooves, and frames respectively slidably fitting the grooves of said upper stop portions and slidably fitting the grooves of said hinged stop members, so that the frame in said members may swing with the latter.

6. A window including a window frame, slidable sashes therein, suspension means to which the sashes are pivotally secured, outer stops on said frame, the portions of which stops at the upper sashes have vertical grooves in the oppositely disposed faces thereof, those portions of said stops at the lower sashes consisting of side members hinged at their upper ends to swing outwardly, said side members being connected by a bottom rail and presenting vertical grooves normally alining with the first-mentioned grooves, and frames respectively slidably fitting said grooved upper stop portions and slidably fitting said hinged stop members.

7. A window including a window frame, slidable sashes therein, suspension means to which the sashes are pivotally secured, outer stops on said frame, the portions of which stops at the upper sashes have vertical grooves in the oppositely disposed faces thereof, those portions of said stops at the lower sashes consisting of side members hinged at their upper ends to swing outwardly, said side members being connected by a bottom rail and presenting vertical grooves normally alining with the first-mentioned grooves, and frames respectively slidably fitting said grooved upper stop portions and slidably fitting said hinged stop members, said hinged side members and said upper stop members being reversely rabbeted at their adjacent ends.

8. A window including a frame, sliding sashes therein, means pivotally mounting the sashes to turn about horizontal axes, inner stop beads on said frame having their lower portions movable to permit turning of the lower sash, and parting strips between the sashes presenting at those faces toward the lower sash recesses permitting said lower sash to be positioned at an angle to the parting strips when the lower portions of said stop beads are moved from their normal position away from the lower sash.

9. A window including a frame, sliding sashes therein, means pivotally mounting the sashes to turn about horizontal axes, and inner and outer stop members on said frame, and parting strips permitting, in their normal positions, a limited turning movement of the lower sash at an angle to said parting strips and having lower portions removable to permit a turning movement of either sash in the lowered position for reversing the sash for cleaning.

10. A window including a frame, sliding sashes therein, suspension means to which said sashes are pivotally secured to turn about horizontal axes, and inner stops, those portions of said stops at the inner sash being hingedly mounted to turn about vertical axes, and vertical weather strips on said hinged stop portions, at the inner edges, said weather strips presenting members projecting beyond the inner edges of the stops, and members projecting from the inner side faces of the stops transversely to the planes of said inner side faces, the lower sash and the window frame having vertical grooves accommodating said members of the weather strips.

ARCHIBALD MacKINNON.